United States Patent
Chang et al.

(10) Patent No.: US 10,236,562 B2
(45) Date of Patent: Mar. 19, 2019

(54) SEPARATED AND OPTIMIZATION SENSOR PAD DESIGN FOR DUAL MODE LTE APPLICATION

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 55 days.

(21) Appl. No.: 15/426,400

(22) Filed: Feb. 7, 2017

(65) Prior Publication Data
US 2018/0138581 A1 May 17, 2018

(30) Foreign Application Priority Data
Nov. 11, 2016 (TW) .............................. 105136811 A (51) Int. Cl.
*H01Q 1/24* (2006.01)
*H04B 1/3827* (2015.01)
(Continued)

(52) U.S. Cl.
CPC ............ *H01Q 1/245* (2013.01); *H01Q 1/2266* (2013.01); *H01Q 1/243* (2013.01); *H01Q 1/44* (2013.01); *H01Q 5/30* (2015.01); *H01Q 5/371* (2015.01); *H01Q 5/378* (2015.01); *H01Q 9/42* (2013.01); *H04B 1/3838* (2013.01)

(58) Field of Classification Search
CPC .......... H01Q 1/245; H01Q 1/243; H01Q 5/30; H04B 1/3838
See application file for complete search history.

(56) References Cited

U.S. PATENT DOCUMENTS 7,576,698 B2 * 8/2009 Cheng .................. H01Q 1/2291
343/700 MS
7,825,868 B2 * 11/2010 Sabet .................. H01Q 1/2241
343/700 MS
(Continued)

FOREIGN PATENT DOCUMENTS

TW       M422176 U      1/2012
TW       201307857 A1   2/2013
(Continued)

OTHER PUBLICATIONS

European Search Report, EP17163853, dated Sep. 26, 2017, 8 pages.
(Continued)

*Primary Examiner* — Dameon E Levi
*Assistant Examiner* — Ab Salam Alkassim, Jr.
(74) *Attorney, Agent, or Firm* — Edell, Shapiro & Finnan, LLC (57) ABSTRACT

A mobile device includes a dual band T-shaped antenna and a sensing element. The sensing element includes a first sensing part extending in first direction, a second sensing part, and a third sensing part, wherein the second sensing part and the third sensing part each includes portions that extend in a second direction that is perpendicular to the first direction. The sensing element is used to both detect proximity to an object, to meet specific absorption rate (SAR) criteria, and to affect resonance of the dual band T-shaped antenna.

19 Claims, 6 Drawing Sheets (51) Int. Cl.
*H01Q 5/30* (2015.01)
*H01Q 1/22* (2006.01)
*H01Q 1/44* (2006.01)
*H01Q 9/42* (2006.01)
*H01Q 5/371* (2015.01)
*H01Q 5/378* (2015.01)

(56) References Cited

U.S. PATENT DOCUMENTS

| | | | | |
|---|---|---|---|---|
| 8,577,289 B2* | 11/2013 | Schlub | ............... | G01B 7/023 343/702 |
| 8,649,833 B1* | 2/2014 | Lee | ............... | H01Q 5/335 455/575.7 |
| 8,971,826 B2* | 3/2015 | Abdul-Gaffoor | .... | H03K 17/955 455/77 |
| 9,478,870 B2* | 10/2016 | Desclos | ............... | H01Q 1/243 |
| 9,502,768 B2* | 11/2016 | Huang | ............... | H01Q 1/002 |
| 9,608,331 B1* | 3/2017 | Rowson | ............... | H01Q 9/16 |
| 9,722,304 B2* | 8/2017 | Yang | ............... | H01Q 1/38 |
| 9,746,571 B2* | 8/2017 | Juan | ............... | H01Q 1/38 |
| 2004/0130492 A1* | 7/2004 | Egawa | ............... | H01Q 1/245 343/702 |
| 2004/0175257 A1* | 9/2004 | Pallas | ............... | H03K 17/955 414/222.02 |
| 2005/0168383 A1* | 8/2005 | Lee | ............... | H01Q 1/2216 343/700 MS |
| 2010/0001908 A1* | 1/2010 | Chen | ............... | H01Q 1/2266 343/700 MS |
| 2012/0214422 A1* | 8/2012 | Shi | ............... | H04B 1/3838 455/67.11 |
| 2012/0229348 A1* | 9/2012 | Chiang | ............... | H01Q 1/2266 343/702 |
| 2012/0229350 A1* | 9/2012 | Chiang | ............... | H01Q 1/2266 343/702 |
| 2012/0329524 A1* | 12/2012 | Kent | ............... | G06F 3/044 455/566 |
| 2013/0029625 A1* | 1/2013 | Park | ............... | H01Q 1/243 455/272 |
| 2013/0127677 A1* | 5/2013 | Lin | ............... | H01Q 5/328 343/722 |
| 2013/0135157 A1* | 5/2013 | Tsou | ............... | H01Q 1/2266 343/702 |
| 2013/0222190 A1* | 8/2013 | Hung | ............... | H01Q 1/38 343/702 |
| 2013/0241796 A1* | 9/2013 | Nagumo | ............... | H01Q 1/243 343/861 |
| 2014/0315606 A1* | 10/2014 | You | ............... | H04B 1/3838 455/575.5 |
| 2014/0333494 A1* | 11/2014 | Huang | ............... | H01Q 1/002 343/720 |
| 2014/0357313 A1* | 12/2014 | Mercer | ............... | H04B 1/3838 455/552.1 |
| 2015/0022403 A1* | 1/2015 | Lin | ............... | H01Q 1/243 343/702 |
| 2015/0171911 A1* | 6/2015 | Yang | ............... | H04B 1/3838 455/280 |
| 2015/0200447 A1* | 7/2015 | Tang | ............... | H01Q 1/243 343/720 |
| 2015/0288074 A1* | 10/2015 | Harper | ............... | H01Q 1/243 343/833 |
| 2015/0380804 A1* | 12/2015 | Lim | ............... | G06F 1/162 343/702 |
| 2016/0065260 A1* | 3/2016 | Heikura | ............... | H04B 1/3838 455/575.5 |
| 2016/0087343 A1* | 3/2016 | Chang | ............... | H01Q 1/245 343/720 |
| 2016/0190699 A1* | 6/2016 | Yang | ............... | H01Q 1/38 343/700 MS |
| 2017/0098887 A1* | 4/2017 | Chen | ............... | H04B 1/3838 |
| 2017/0125916 A1* | 5/2017 | Camacho | ............ | H01Q 19/005 |
| 2017/0160416 A1* | 6/2017 | Juan | ............... | H01Q 1/38 |
| 2017/0248725 A1* | 8/2017 | Yang | ............... | H04B 1/3838 |
| 2017/0309993 A1* | 10/2017 | Tu | ............... | H01Q 1/243 |
| 2018/0212313 A1* | 7/2018 | Harper | ............... | H01Q 1/50 |
| 2018/0277951 A1* | 9/2018 | Nishikawa | ............ | H01Q 5/307 |
| 2018/0284045 A1* | 10/2018 | Jahn | ............... | G01N 27/026 |

FOREIGN PATENT DOCUMENTS

TW 201620203 A 6/2016
TW 201628261 A 8/2016

OTHER PUBLICATIONS

Taiwan Search Report, dated Mar. 22, 2018, 1 page.
Taiwan Office Action, dated Mar. 23, 2018, 5 pages.

* cited by examiner

SEPARATED AND OPTIMIZATION SENSOR PAD DESIGN FOR DUAL MODE LTE APPLICATION

RELATED APPLICATION DATA

This application claims priority under 35 U.S.C. § 119 to Taiwan patent application TW 105136811, filed on Nov. 11, 2016, the disclosure of which is incorporated herein by reference in its entirety.

TECHNICAL FIELD

Embodiments of the present invention are directed to integrating an antenna and sensing pad of element.

BACKGROUND

Specific absorption rate (SAR) is a measure of the rate at which energy is absorbed by the human body when exposed to a radio frequency (RF) electromagnetic field. This measure has become increasingly important as mobile devices have become smaller and users have come to rely increasingly on such devices and use them close to their bodies. The United States and Europe have their own somewhat different standards, but the basic goal of protecting mobile device users from over exposure to RF energy is the same. To help monitor the RF field generated by a given device, a sensing pad or element may be disposed in the device to detect the level energy. A too high level of detected energy may trigger the device to reduce emitted power.

The integration of an antenna and sensing pad becomes increasingly problematic, however, as the mobile device itself becomes smaller and thinner since the sensing pad may detrimentally influence the performance of an antenna that is mounted nearby.

As an example, notebook computers are often designed with a keyboard component and a display component, connected via hinge, that can be opened and closed like a clamshell, or placed in a tablet configuration. In one possible configuration, the antenna might be disposed on an edge of the display component, and the sensing pad may be disposed on an edge of the keyboard component that is furthest from the edge in which the antenna is located. A problem occurs, however, when the notebook is configured in a tablet mode and the two edges, in which the antenna and sensing pad are respectively disposed, may be positioned close together. The proximity of the antenna and sensing pad may not only detrimentally influence the performance of the antenna, particularly in a low band, but may also impact accurately measuring SAR.

SUMMARY

The present invention provides a sensing element, including, a first sensing part extending in first direction, a second sensing part, and a third sensing part, wherein the second sensing part and the third sensing part each comprises portions that extend in a second direction that is perpendicular to the first direction and.

The first sensing part may include a first gap and a second gap.

The second sensing part and the third sensing part may extend from the first gap and the second gap, respectively.

The second sensing part and the third sensing part each may include a portion that extends in a same direction as the first direction.

The portion that extends in a same direction as the first direction may be aligned with the first gap and the second gap, respectively.

The second sensing part and the third sensing part may each include bends.

The sensing element may further include a first metal sheet and a second metal sheet, the first metal sheet extending from one end of the first sensing part, and the second metal sheet extending from a second end of the first sensing part.

The sensing element may be configured to sense radio frequency energy to comply with specific absorption rate (SAR) criteria.

The second sensing part and the third sensing part may be configured to effect resonance of a high band and a low band of a dual band antenna. The dual band antenna may be configured to resonate at frequencies compliant with the Long Term Evolution (LTE) standard.

In another embodiment, a mobile device includes a dual band T-shaped antenna, and a sensing element, wherein the sensing element includes: a first sensing part extending in first direction, a second sensing part, and a third sensing part, wherein the second sensing part and the third sensing part each includes portions that extend in a second direction that is perpendicular to the first direction.

The first sensing part may include a first gap and a second gap.

The second sensing part and the third sensing part may extend from the first gap and the second gap, respectively.

The second sensing part and the third sensing part may each include a portion that extends in a same direction as the first direction.

The portion that extends in a same direction as the first direction may be aligned with the first gap and the second gap, respectively.

The mobile device may be a convertible notebook computer that can be configured in a tablet mode.

The convertible notebook computer may include a first chassis, a hinge and second chassis connected to the first chassis via the hinge, wherein the dual band T-shaped antenna may be disposed in the first chassis and the sensing element may be disposed in the second chassis.

When the convertible notebook is configured in tablet mode the dual band T-shaped antenna and the sensing element may be configured to be in parallel planes.

The second sensing part and the third sensing part may be configured to effect resonance of the dual band T-shaped antenna.

The sensing element may be configured to sense radio frequency energy to comply with specific absorption rate (SAR) criteria.

In another embodiment the first heat dissipation structure is comprised of a sheet of metal that includes a plurality of bent tabs, punched, and extending, from the sheet of metal.

BRIEF DESCRIPTION OF THE DRAWINGS

Embodiments are described herein in conjunction with the accompanying drawings, in which.

DESCRIPTION OF EXAMPLE EMBODIMENTS

Figure 1:
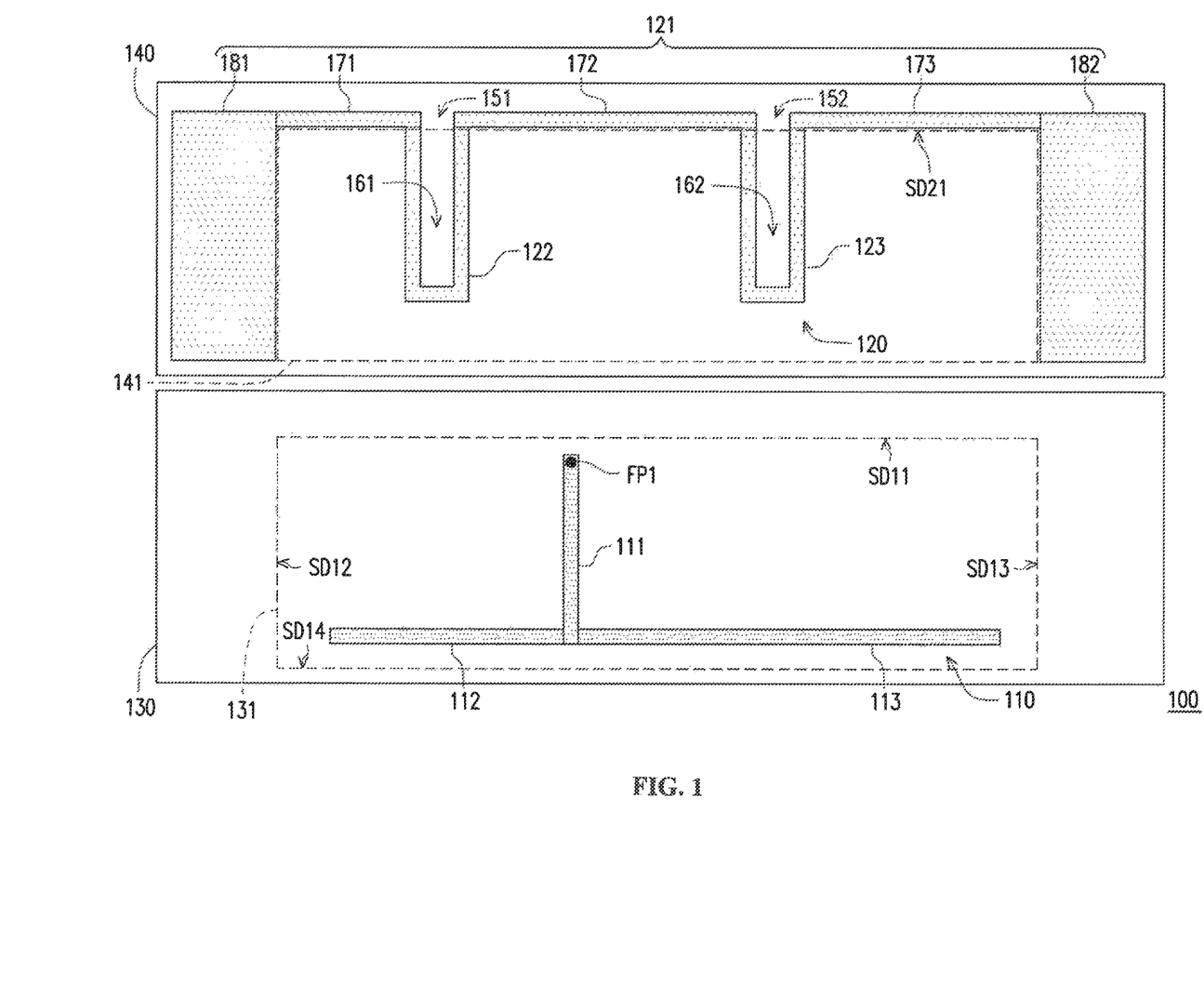
FIG. 1 is a schematic view illustrating components of an electronic device according to an embodiment of the invention.

FIG. 1 is a schematic view illustrating components of an electronic device according to an embodiment of the invention. As shown, a mobile device 100 includes antenna element 110 and sensing element (or pad) 120. Antenna element 110 is deployed on first plane 130, and, for purposes of description, first plane 130 includes first predetermined area 131. As shown, antenna element 110 is deployed inside first predetermined area 131 and is configured to operate in a first band and a second band. For example, antenna element 110 can be a dual-band monopole antenna configured to resonate at frequencies compliant with the Long Term Evolution (LTE) standard.

Sensing element 120 is deployed on a second plane 140 and includes first, second and third sensing parts 121, 122, 123, respectively. Second plane 140 includes second predetermined area 141. The first sensing part 121 is deployed outside second predetermined area 141 and includes a first gap 151 and a second gap 152.

The second sensing part 122 and third sensing part 123 are deployed inside second predetermined area 141. As shown, second sensing part 122 includes several bends in order to form first concave portion 161, which is connected to first gap 151. The third sensing part also includes several bends in order to form second concave portion 162, which is connected to second gap 152.

In one embodiment of the invention, first plane 130 and second plane 140 are parallel to each other when mobile device 100 (e.g., a laptop computer) is configured as a tablet. In another embodiment, first plane 130 and second plane 140 always maintain a parallel positioning with respect to each other. Additional details regarding the first plane 130 and the second plane 140 will be discussed later herein. The relative location and deployment of antenna element 110 and sensing element 120 will also be explained in more detail below.

Figure 2:
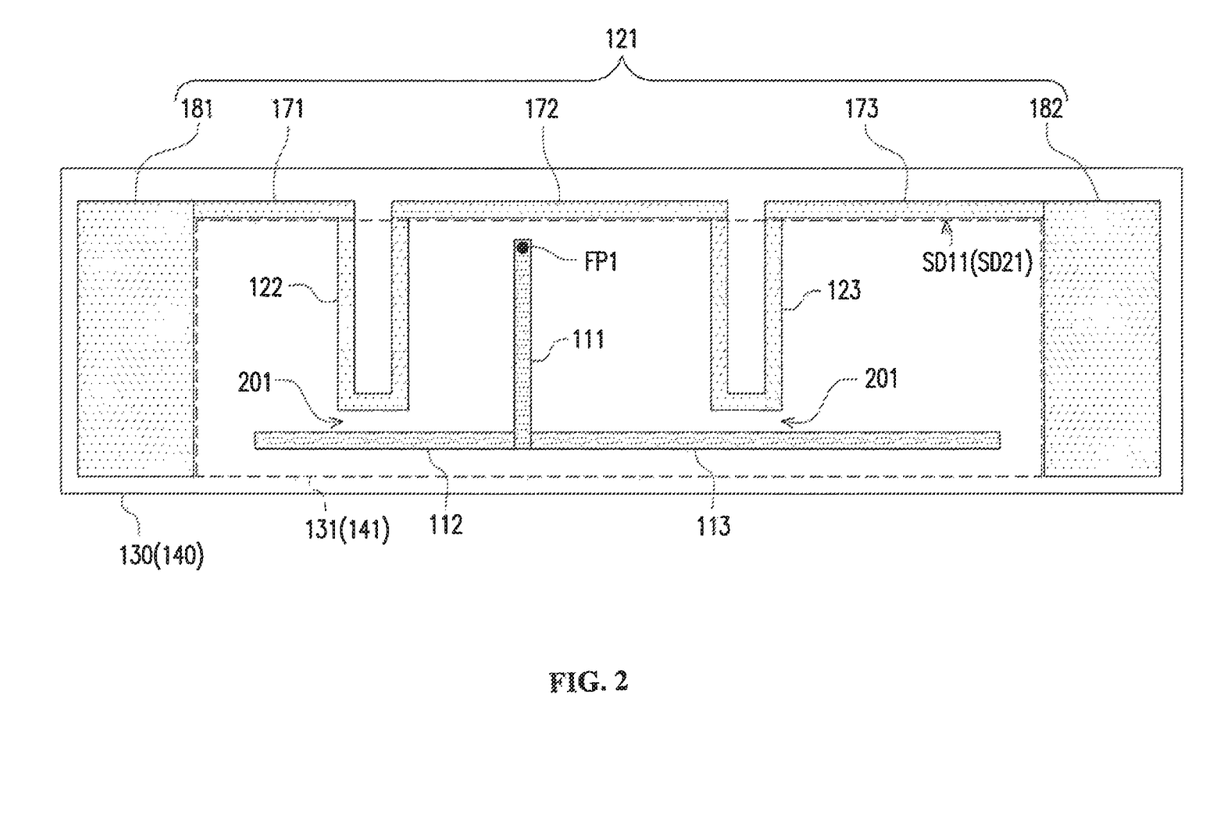
FIG. 2 is a transparent schematic view illustrating an antenna element and sensing element according to an embodiment of the invention.

FIG. 2 is a transparent schematic view illustrating an antenna element and sensing element according to an embodiment of the invention. In this view, an antenna element 110 and sensing element 120 can be seen as being on a same plane from a perspective-top view. As shown, when first plane 130 and second plane 140 are parallel to each other, the orthographic projection area of the second predetermined area 141 on the first plane 130 overlaps with first predetermined area 131 completely. Notably, in the depicted orthographic projection, sensing element 120 on first plane 130 does not overlap antenna element 110.

More specifically, when first plane 130 and second plane 140 are parallel to each other, the orthographic projection area of the first sensing part 121 on first plane 130 aligns along the outside edges SD11, SD12, SD13 of first predetermined area 131, which contains antenna element 131. That is, in the depicted embodiment, the orthographic projection area of first sensing part 121 on first plane 130 aligns along the edges of first predetermined area 131 except for edge SD14.

Further, in the orthographic projection, second sensing part 122 and third sensing part 123 on first plane 130 are inside predetermined area 131 and extend toward antenna element 110, respectively.

In other words, when first plane 130 and second plane 140 are parallel to each other, the second sensing part 122 and the third sensing part 123 are adjacent antenna element 110. As a result, second sensing part 122 and third sensing part 123 can be used not only as a sensing element, but can also be employed to fine-tune the resonance of antenna element 110.

Specifically, when first plane 130 and second plane 140 are parallel to each other and the first predetermined area 131 and second predetermined area 141 are aligned with each other, the second sensing part 122 can be used to adjust the resonant frequency of the first band of antenna element 110 (e.g., high-band resonance), and third sensing part 123 can be used to adjust the resonant frequency of the second band of antenna element 110 (e.g., low-band resonance). As a result of the configuration of sensing element 120, it is possible to reduce the typical detrimental impact a SAR sensing element might have on an antenna element in a small mobile device 100.

As shown in FIGS. 1 and 2, sensing parts 121-123 are connected to each other, and thus function as a one-piece sensing electrode. In operation, mobile device 100 can detect an object (e.g., a human body) that is close to or approaching antenna element 110. For example, when an object is approaching antenna element 110, sensing element 120 can generate a signal to mobile device 100 suggesting that the mobile device 100 should reduce the transmitting power of antenna element 110.

Figure 3:
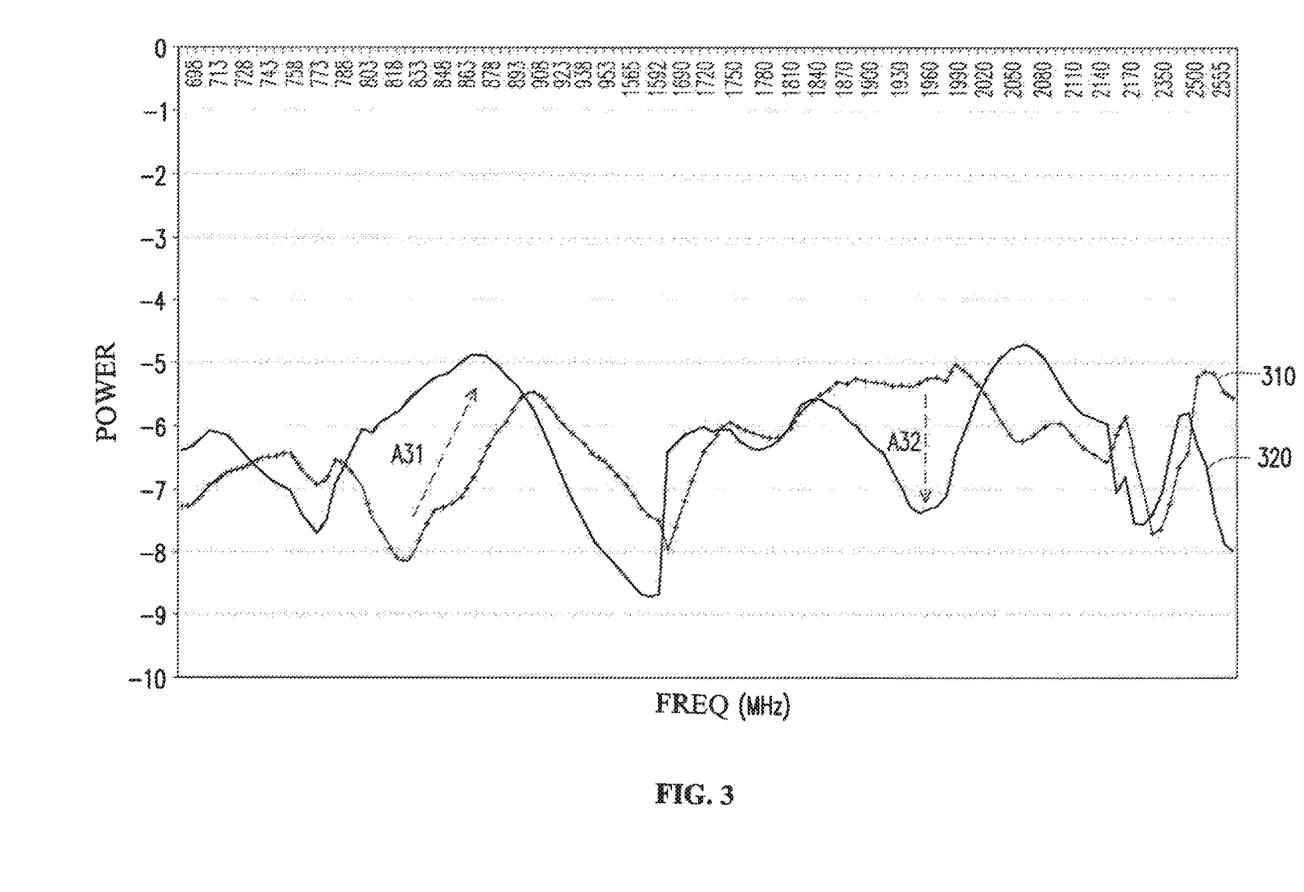
FIG. 3 is a graph depicting low band and high band antenna performance according to an embodiment of the present invention.

As noted, sensing element 120 can also be used to optimize the performance of antenna element 110. FIG. 3 is a graph depicting low band and high band antenna performance according to an embodiment of the present invention. Plot 310 is a plot showing transmitted power with a sensing element without the second and third sensing parts 122, 123, and gaps 151, 152, and plot 320 is a plot showing transmitted power with a sensing element in accordance with the present invention. That is, when a sensing element does not include the two gaps 151, 152 or sensing parts 122, 123, the sensing element would be substantially U-shaped and the antenna has the performance consistent with plot 310. However, with the sensing element 120 with two gaps 151, 152 and sensing parts 122, 123 with the indicated concave structure, improved performance of the antenna is shown by curve 320.

With reference still to FIG. 3, the third sensing part 123 can be used to adjust the resonant frequency of the second band (e.g., the low-band) of antenna element 110. Specifically, the energy in the low-band can be better optimized as indicated by arrow A31. Likewise the second sensing part 122 can be used to adjust resonance of first band (e.g., the high-band) of antenna element 110. Specifically, and as shown by arrow A32, the performance of the first band can be degraded intentionally in order to make the first band (e.g., the high-band) of antenna element 110 more easily meet SAR criteria.

Referring again to FIGS. 1 and 2, more detail regarding the structure of antenna element 110 and sensing element 120 is provided. Antenna element 110 includes first radiation part 111, second radiation part 112 and third radiation part 113. The first radiation part 111 extends in a direction that is perpendicular to edge SD11 of first predetermined area 131. The second radiation part 112 and third radiation part 113 extend in a direction that is parallel to edge SD11.

A first endpoint, or feed point, FP1 of first radiation part 111 is disposed near edge SD11. A first endpoint of second radiation part 112 is connected to a second endpoint of first radiation part 111, and a second endpoint of second radiation part 112 is a first open-end. A first endpoint of third radiation part 113 is connected to the second endpoint of first radiation part 111, and the second endpoint of third radiation part 113 is a second open-end. That is, the first radiation part 111, the second radiation part 112, and the third radiation part 113 form a T-structure or T-shape metal trace, as shown.

In operation, first radiation part 111 and second radiation part 112 can form one resonant path from FP1 to the first open-end. The first radiation part 111 and third radiation part 113 can form a second resonant path from FP1 to second open-end. In this way, antenna element 110 can operate in a first-band via the first resonance path and can operate in a second-band via the second resonance path. In one implementation, the length of first resonance path is about a quarter-wavelength of first band and the length of the second resonance path is about a quarter-wavelength of second band.

Sensing element 120 includes metal traces 171, 172, 173, and first metal sheet 181 and second metal sheet 182. The metal traces 171-173 extend in a direction that is parallel to the edge SD21 of second predetermined area 141. That is, metal traces 171-173 are aligned with edge SD21. Gap 151 is provided between a first endpoint of metal trace 171 and a first endpoint of metal trace 172, and a gap 152 is provided between a second endpoint of metal trace 172 and a first endpoint of metal trace 173.

A first endpoint of second sensing part 122 is connected to the first endpoint of first metal trace 171, and a second endpoint of second sensing part 122 is connected to the first endpoint of second metal trace 172. A first endpoint of third sensing part 123 is connected to the second endpoint of third metal trace 173. In one embodiment, the second sensing part 122 and third sensing part 123 can be U-shape metal traces, respectively. The first metal sheet 181 and the second metal sheet 182 can extend in a direction that is perpendicular to edge SD21 of the second predetermined area 141. Lastly, the first metal sheet 181 is connected to the second endpoint of metal trace 171, and the second metal sheet 182 is connected to the second endpoint of third metal trace 173.

As shown in FIG. 2, when first plane 130 and second plane 140 are parallel to each other, the orthographic projection of SD21 of second predetermined area 141 on first plane 130 overlaps with edge SD11 of first predetermined area 131. In addition, a coupling gap 201 is established between the orthographic projection of second sensing part 122 on first plane 130 and second radiation part 112, and a coupling gap 201 is established between the orthographic projection of third sensing part 123 on first plane 130 and third radiation part 113.

Thus, when the first plane 130 and second plane 140 are parallel to each other, the signal which comes from second radiation part 112 can be coupled to second sensing part 122 by coupling gap 201. In this way, the resonance of the first band of antenna element 110 can be adjusted by second sensing part 122. Similarity, the signal which comes from radiation part 113 can be coupled to third sensing part 123 by coupling-gap 201. The resonance of the second band of antenna element 110 can be fine-tuned by third sensing part 123.

In addition, when first plane 130 and second plane 140 are parallel to each other, the orthographic projection of the second metal trace 172 on first plane 130 is adjacent the first endpoint of radiation part 111. Also, the orthographic projection of first metal sheet 181, first metal trace 171, second metal trace 172 and first radiation part 111 surrounds the second sensing part 122. Likewise, the orthographic projection of the second metal sheet 182, third metal trace 173, second metal trace 172, first radiation 111 and third radiation part 113 on second plane 140 surrounds third sensing part 123.

In one possible implementation, mobile device 100 can be a convertible notebook computer and antenna element 110 may be deployed on first plane 130 parallel to sensing element 120 deployed on second plane 140 when the convertible notebook is configured to operate in a tablet mode.

Figure 4:
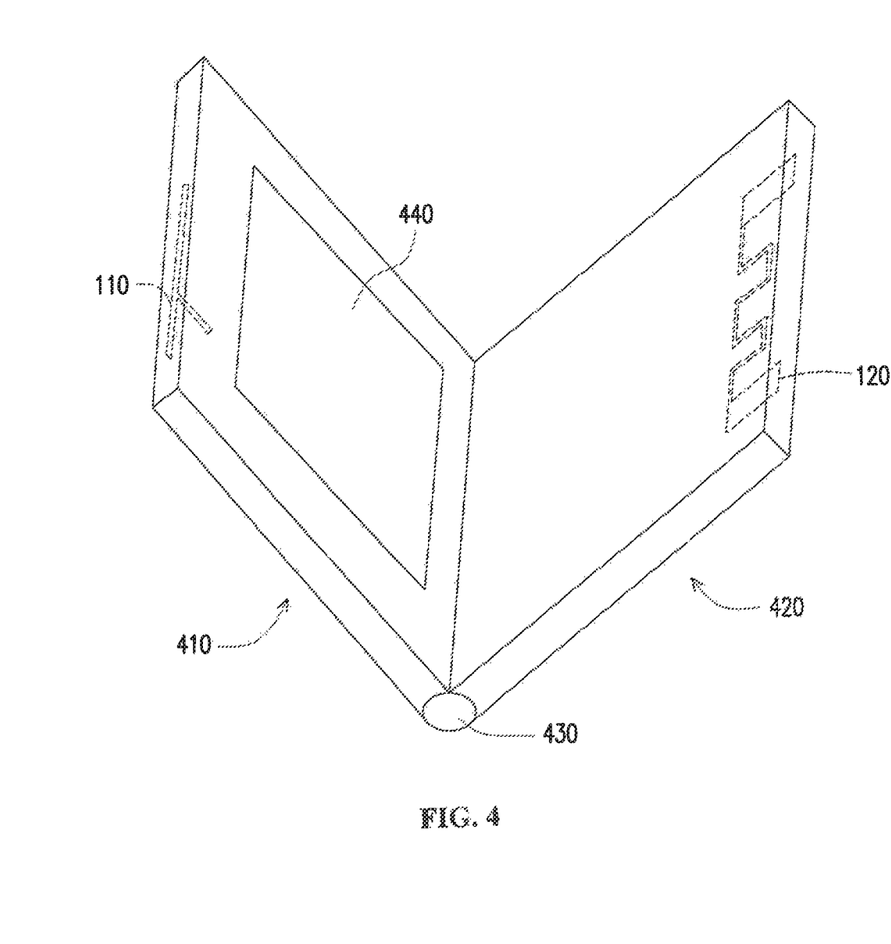
FIG. 4 is a schematic diagram illustrating a notebook computer in an open configuration with an antenna and sensing pad according to an embodiment of the invention.

In this regard, FIG. 4 is a schematic diagram illustrating a notebook computer in an open configuration according to an embodiment of the invention. In FIG. 4, mobile device 100 includes first chassis 410, second chassis 420 and hinge 430. Antenna element 110 can be deployed inside first chassis 410 and sensing element 120 can be put inside second chassis 420. More specifically, antenna element 110 can be disposed at a top edge of first chassis 410 which is furthest from hinge 430 and sensing element 120 can be disposed on bottom-edge of chassis 420 which is furthest from hinge 430.

Figure 5:
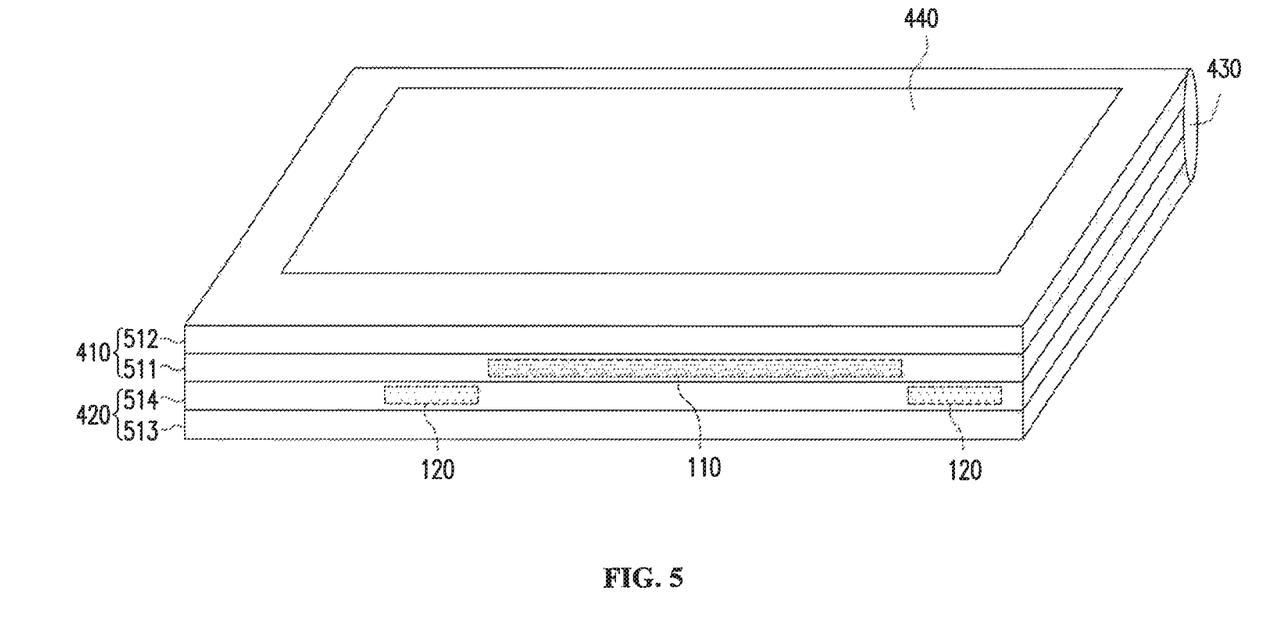
FIG. 5 is a schematic diagram illustrating a notebook computer in a closed configuration with an antenna and sensing pad according to an embodiment of the invention.

The first chassis 410 and the second chassis 420 can rotate around hinge 430 such that the notebook computer can be configured in a clamshell mode or a tablet mode. In this regard, FIG. 5 is a schematic diagram illustrating a notebook computer in a tablet configuration according to an embodiment of the invention. In this case, when first chassis 410 is rotated 360 degrees relative to second chassis 420, the first chassis 410 and second chassis 420 are stacked in a tablet mode.

When first chassis 410 and second chassis 420 are stacked in tablet mode, antenna element 110 which is on first plane 130 is arranged in parallel to sensing element 120 which is on second plane 140. In this configuration, the orthographic projection of antenna element 110 and sensing element 130 on chassis 410 and 420 is like that shown in FIG. 2. FIG. 5 depicts a side-view for antenna element 110 and sensing element 120 in chassis 410 and 420.

Furthermore, the first chassis 410 includes first back-cover 511 and first frame 512 and the display 440 of first chassis is surrounded by the first frame 512. The second chassis 420 includes second frame 513 and second back-cover 514. Antenna element 110 may be disposed in first back cover 511. Sensing element 120 may be disposed in second back-cover 514.

It is noted that because antenna element 110 and sensing element 120 are disposed in separate chassis 410 and 420, respectively, the antenna element 110 which is disposed in first chassis 410 is further away from back cover 513 and side-face of first chassis 410. The side-face and back-cover-face of mobile device 100 are the reference plane for testing SAR, and with such a configuration, mobile device 100 may more easily meet SAR test criteria.

In another embodiment of the invention, mobile device 100 can be a tablet computer, and antenna element 110 and sensing element 120 can be on the same substrate inside the tablet computer. In this regard, FIG. 6 is a schematic view illustrating placement of antenna element and sensing element according to an embodiment of the invention.

Figure 6:
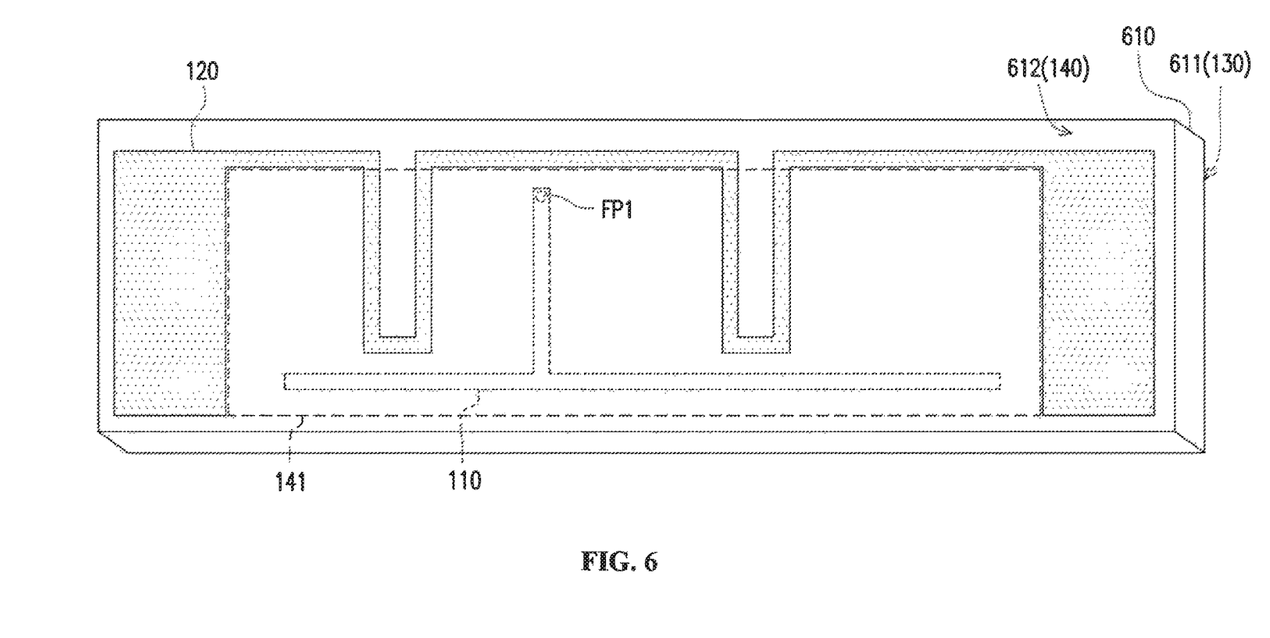
FIG. 6 is a schematic view illustrating placement of antenna element and sensing pad according to another embodiment of the invention.

For example, FIG. 6 is a schematic view illustrating placement of antenna element and sensing element according to an embodiment of the invention. As shown in FIG. 6, mobile device 100 includes substrate 610. Antenna element 110 is disposed on a first surface 611 of substrate 610 and sensing element 120 is disposed on a second surface 612 of substrate 610. First surface 611 is on an opposite side of surface 612.

In other words, in the embodiment of FIG. 6, surface 611 and surface 612 can function as first plane 130 and second plane 140, respectively. As such, the orthographic projection of antenna element 110 and sensing element 120 on first surface 611 and second surface 612 is the same as that shown in FIG. 2.

In sum, a mobile device according to the present invention, provides a sensing element that not only can detect a surrounding object, but can also be used to optimize resonance of an antenna element by increasing low band performance, while slightly decreasing high band performance, thereby improving performance in view of SAR criteria.

The above description is intended by way of example only.

What is claimed is:

1. A sensing element, comprising:
a first sensing part extending in a first direction;
a second sensing part;
a third sensing part;
a first metal sheet and a second metal sheet, the first metal sheet extending from one end of the first sensing part, and the second metal sheet extending from a second end of the first sensing part,
wherein the second sensing part and the third sensing part are U-shaped and each comprise portions that extend in a second direction that is perpendicular to the first direction, and
wherein a first distance, extending in the first direction, between an edge of the first metal sheet facing an edge of the second sensing part and an edge of the second sensing part is less than a second distance, extending in the first direction, between an edge of the third sensing part and an edge of the second metal sheet facing the third sensing part, which is less than a third distance between an edge of the second sensing part facing an edge of the third sensing part and an edge of the third sensing part facing an edge of the second sensing part.

2. The sensing element of claim 1, wherein the first sensing part includes a first gap and a second gap.

3. The sensing element of claim 2, wherein the second sensing part and the third sensing part extend from the first gap and the second gap, respectively.

4. The sensing element of claim 3, wherein the second sensing part and the third sensing part each comprises a portion that extends in a same direction as the first direction.

5. The sensing element of claim 4, wherein the portion that extends in a same direction as the first direction is aligned with the first gap and the second gap, respectively.

6. The sensing element of claim 4, wherein the second sensing part and the third sensing part each comprise bends.

7. The sensing element of claim 1, wherein the sensing element is configured to sense radio frequency energy to comply with specific absorption rate (SAR) criteria.

8. The sensing element of claim 1, wherein the second sensing part and the third sensing part are configured to effect resonance of a high band and a low band of a dual band antenna.

9. The sensing element of claim 8, wherein the dual band antenna is configured to resonate at frequencies compliant with the Long Term Evolution (LTE) standard.

10. A mobile device, comprising:
a dual band T-shaped antenna; and
a sensing element,
wherein the sensing element comprises:
a first sensing part extending in a first direction;
a second sensing part;
a third sensing part,
a first metal sheet and a second metal sheet, the first metal sheet extending from one end of the first sensing part, and the second metal sheet extending from a second end of the first sensing part,
wherein the second sensing part and the third sensing part are U-shaped and each comprise portions that extend in a second direction that is perpendicular to the first direction, and
wherein a first distance, extending in the first direction, between an edge of the first metal sheet facing an edge of the second sensing part and an edge of the second sensing part is less than a second distance, extending in the first direction, between an edge of the third sensing part and an edge of the second metal sheet facing the third sensing part, which is less than a third distance between an edge of the second sensing part facing an edge of the third sensing part and an edge of the third sensing part facing an edge of the second sensing part.

11. The mobile device of claim 10, wherein the first sensing part includes a first gap and a second gap.

12. The mobile device of claim 11, wherein the second sensing part and the third sensing part extend from the first gap and the second gap, respectively.

13. The mobile device of claim 12, wherein the second sensing part and the third sensing part each comprises a portion that extends in a same direction as the first direction.

14. The mobile device of claim 13, wherein the portion that extends in a same direction as the first direction is aligned with the first gap and the second gap, respectively.

15. The mobile device of claim 10, wherein the mobile device is a convertible notebook computer that can be configured in a tablet mode.

16. The mobile device of claim 15, wherein the convertible notebook computer has a first chassis, a hinge and second chassis connected to the first chassis via the hinge, and wherein the dual band T-shaped antenna is disposed in the first chassis and the sensing element is disposed in the second chassis.

17. The mobile device of claim 16, wherein when the convertible notebook is configured in tablet mode the dual band T-shaped antenna and the sensing element are configured to be in parallel planes.

18. The mobile device of claim 10, wherein the second sensing part and the third sensing part are configured to effect resonance of the dual band T-shaped antenna.

19. The mobile device of claim 10, wherein the sensing element is configured to sense radio frequency energy to comply with specific absorption rate (SAR) criteria.

* * * * *